Feb. 7, 1928.

Re. 16,867

L. J. D. HEALY

PAVING BLOCK

Original Filed Aug. 5, 1921

INVENTOR:
LEON J. D. HEALY

BY

Edwin B. H. Tower Jr. ATTY.

Reissued Feb. 7, 1928.

Re. 16,867

UNITED STATES PATENT OFFICE.

LEON J. D. HEALY, OF MILWAUKEE, WISCONSIN, ASSIGNOR TO WRIGHT RUBBER PRODUCTS COMPANY, OF RACINE, WISCONSIN, A CORPORATION OF WISCONSIN.

PAVING BLOCK.

Original application filed August 5, 1921, Serial No. 490,038. Continued and application filed November 23, 1921, Serial No. 517,249. Original No. 1,437,304, dated November 28, 1922. Application for reissue filed November 20, 1924. Serial No. 751,191.

This invention relates to a paving or covering block.

It applies particularly to a paving or covering block which has flanges on its base to interlock it with adjoining blocks.

An object of the invention is to provide a strong, durable and efficient paving block.

Another object is to provide a paving block which will be positively interlocked in alinement with its adjoining blocks.

Another object is to provide a paving block which will produce a pavement in which an even surface will be maintained.

Another object is to provide a paving block, any side of which will interlock with any side of an adjoining block.

Another object is to provide a paving block which may be readily fastened to its support or foundation and thereby held from warping and creeping.

Another object is to provide a paving block which may be readily and economically manufactured.

According to this invention, the block is provided with a top having vertical edges and a bottom having vertical edges and shaped to provide on each side a complementary flange and recess each having a flat top.

The pavement or covering produced by this block has each block vertically and laterally interlocked in both directions with its adjoining block on each side thereof.

The block is ordinarily made of a resilient substance, for instance, rubber or other suitable material, and molded or pressed into shape.

It is employed for paving or covering roads, streets, walks, floors and walls, and various other purposes, and it is particularly suitable for pavements which are subjected to heavy loads and incessant wear.

The drawing illustrates a block embodying the invention, and the views thereof are as follows.

Figure 1:
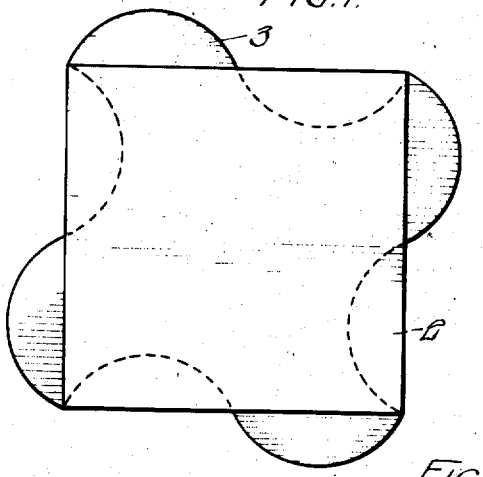
Fig. 1 is a top plan view of a single block.
Figure 2:
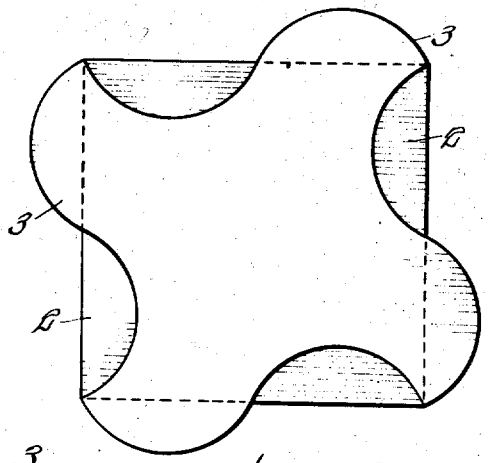
Fig. 2 is a bottom plan view thereof.
Figure 3:
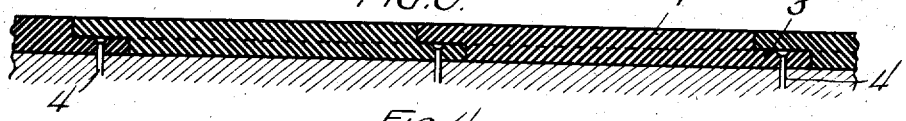
Fig. 3 is a vertical cross-section of a pavement formed by the blocks.
Figure 4:
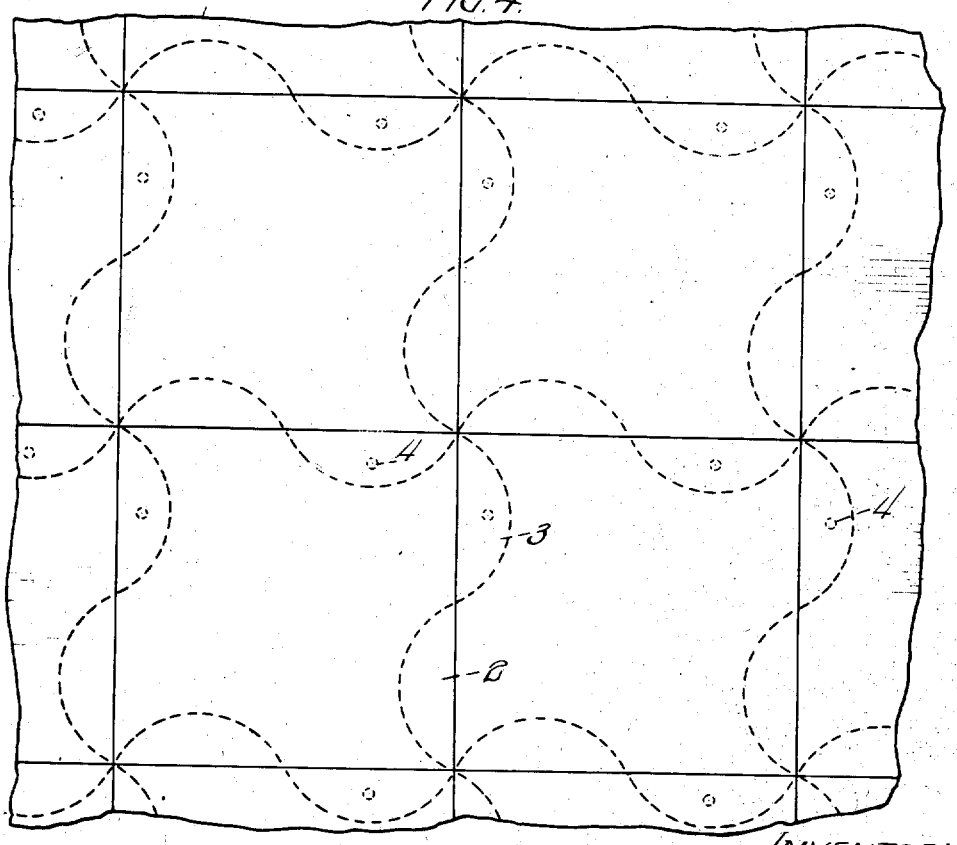
Fig. 4 is a plan view thereof.

The block has a top 1 which has a square or other suitable shape, and a bottom 2 which is integral therewith and has a different shape.

The bottom is shaped to provide the block with complementary contiguous flanges 3 and recesses 4 for interlocking it to its adjoining blocks.

The flanges project beyond the top and the recesses extend underneath the same.

The block has each side thereof provided with a flange and a recess to interlock it vertically and laterally in both directions to its adjoining block on each side thereof.

The flanges and recesses are arranged in horizontal alignment alternately entirely around the block, and the adjacent flange and recess on each side may have the edges thereof merge into each other and form an ogee curve.

The top and bottom have vertical edges and the flanges and recesses have flat tops.

When the block adjoins a similar block, its flange extends under the top thereof and is entirely covered thereby.

In order to hold the block from warping and creeping, its flanges may be fastened to its support or foundation by nails 5 or other means, and further, it may be cemented thereto.

The block may be cemented to its adjoining block or blocks and thereby a water-tight joint formed between the same.

The pavement produced by the block set forth herein has each block vertically and laterally interlocked to its adjoining block on each side thereof, and thereby it is retained in vertical and lateral alignment therewith.

When the block tends to move vertically relatively to its adjoining blocks, it does not cause its adjoining blocks to move laterally away therefrom, as it has vertical edges and flat top flanges and recesses.

Accordingly, a pavement is provided which will maintain an even surface and which will stand heavy loads and incessant wear.

The invention set forth herein may be embodied in various forms which will be within the claims hereof. The invention is hereby claimed as follows.

What I claim is:

1. A paving or covering block comprising a top having vertical edges and a bottom having vertical edges and shaped to form entirely around said block alternate flat top flanges and recesses to interlock said block vertically and laterally in both directions to its adjoining blocks.

2. A paving or covering block comprising a polygonal top having vertical edges and a bottom having vertical edges and shaped to form entirely around said block flat top flanges extending beyond said top and complementary intervening recesses extending underneath said top.

3. A paving or covering block comprising a rectilinear top having vertical edges and a bottom having vertical edges and shaped to form on each side of said top a flat top flange and a complementary recess to interlock said block vertically and laterally in both directions to its adjoining blocks.

4. A resilient paving or covering block comprising a polygonal top having vertical edges and a bottom having vertical edges and shaped to form entirely around said block flat top flanges extending beyond said top and complementary intervening recesses extending underneath said top.

5. A resilient paving or covering block comprising a rectilinear top having vertical edges and a bottom having vertical edges and shaped to form on each side of said top a flat top flange and a complementary recess to interlock said block vertically and laterally in both directions to its adjoining blocks.

6. A paving or covering block comprising a top having vertical edges and a bottom having vertical edges and shaped to form on each side of the top a flat top flange extending beyond the top and a recess extending underneath the top and shaped to receive the flat top flange of a corresponding adjoining block.

7. A paving or covering block comprising a top having vertical edges and a bottom having vertical edges and shaped to provide on each side of the top a flat top flange and recess arranged in horizontal alinement and having the edges thereof merging into each other.

8. A paving or covering block comprising a top having vertical edges and a bottom having an ogee vertical edge on each side of the top to provide a flat top flange extending beyond the top and a complementary recess extending underneath the top and shaped to receive the flat top flange of a corresponding adjoining block.

LEON J. D. HEALY.